United States Patent [19]

Hannon et al.

[11] Patent Number: 5,596,450
[45] Date of Patent: Jan. 21, 1997

[54] LIGHT REFLECTANT SURFACE AND METHOD FOR MAKING AND USING SAME

[75] Inventors: Gregory E. Hannon, Newark, Del.; Gordon L. McGregor, Landenberg, Pa.; Raymond B. Minor, Elkton, Md.

[73] Assignee: W. L. Gore & Associates, Inc., Newark, Del.

[21] Appl. No.: 369,850

[22] Filed: Jan. 6, 1995

[51] Int. Cl.$^6$ .......................................................... F21V 7/00
[52] U.S. Cl. ........................... 359/599; 359/515; 362/341
[58] Field of Search .................................. 359/599, 515; 362/341; 428/315.5, 311.1, 314.7; 521/142; 526/242, 250, 255

[56] References Cited

U.S. PATENT DOCUMENTS

| 3,953,566 | 4/1976 | Gore | 264/288 |
|---|---|---|---|
| 3,962,153 | 6/1976 | Gore | 260/2.5 R |
| 4,035,085 | 7/1977 | Seiner | 356/179 |
| 4,096,227 | 6/1978 | Gore | 264/210 R |
| 4,187,390 | 2/1980 | Gore | 174/102 R |
| 4,354,741 | 10/1982 | Mano et al. | 350/357 |
| 4,463,045 | 7/1984 | Ahr et al. | 428/131 |
| 4,523,319 | 6/1985 | Pfost | 372/54 |
| 4,571,448 | 2/1986 | Barnett | 136/259 |
| 4,764,932 | 8/1988 | Peterson et al. | 372/34 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |
| 4,912,720 | 3/1990 | Sprinsteen | 372/72 |
| 4,994,673 | 2/1991 | Perna et al. | 250/483.1 |
| 5,116,115 | 5/1992 | Lange et al. | 351/212 |
| 5,227,634 | 7/1993 | Ruyo et al. | 250/368 |
| 5,241,280 | 8/1993 | Ishaque et al. | 250/361 R |
| 5,263,042 | 11/1993 | Kojima et al. | 372/72 |
| 5,410,791 | 5/1995 | Wirth et al. | 29/235 |
| 5,422,756 | 6/1995 | Weber | 359/487 |
| 5,462,705 | 10/1995 | Sprinsteen | 254/122 |
| 5,488,473 | 1/1996 | Springsteen et al. | 356/317 |

FOREIGN PATENT DOCUMENTS

| 0313263A2 | 4/1989 | European Pat. Off. . |
| 0372224A2 | 6/1990 | European Pat. Off. . |

OTHER PUBLICATIONS

S. Nutter, C. R. Bower, M. W. Gebhard, R. M. Heinz and G. Spiczak, "Sintered Halon as a diffuse reflecting liner for light integration boxes," Nuclear Instruments and methods in Physics Research A310 (1991) 665–670.

T. K. Lewellen, R. S. Miyaoka, S. G. Kohlmyer, "Improving the Performance of the SP–3000 PET Detector Modules," IEEE Transactions on Nuclear Science, 1992, V39, N4 (Aug.), pp. 1604–1608.

"Diffuse Relectance coatings and Materials," Labsphere (R), 1996 Catalog, pp. 32–43 Brochure: Labsphere, 1994–1995, pp. 130–135.

"Prototype Crystals For the Karlsruhe 4–Barium Fluoride Detector," K. Wisshak, F. Kappeler, and H. Muller, Nuclear Instruments and Methods in Physics Research A251 (1986) 101–107.

(List continued on next page.)

Primary Examiner—Timothy P. Callahan
Assistant Examiner—Jung Ho Kim
Attorney, Agent, or Firm—David J. Johns

[57] ABSTRACT

The present invention is an improved material and method for use for providing diffuse reflectivity of light. By employing an expanded polytetrafluoroethylene (PTFE) comprising a microstructure of polymeric nodes and fibrils, the material of the present invention demonstrates exceptional diffuse reflectivity across a wide spectrum of visible and infrared light. Additionally, the material of the present invention provides many properties that have been previously unavailable in highly diffuse reflective material, including a high degree of malleability, moldability and flexibility, and effective reflectivity even at relatively thin cross-sections.

31 Claims, 6 Drawing Sheets

OTHER PUBLICATIONS

Literature: "Reflectance Stability Analysis of Spectralon Diffuse Calibration Panels," Carol J. Bruegge, Albert Stiegman, Daniel R. Coulter, Robert R. Hale, David J. Diner, SPIE vol. 1493 Calibration of Passive Remote Observing Optical and Microwave Instrumentation (1991), pp. 132–142.

Literature: "A Novel Class of Lambertian Reflectance Materials for Remote Sensing Application," SPIE vol. 1109 Optical Radiation Measureents II (1989), A. W. Springsteen, pp. 133–141.

LIGHT REFLECTANT SURFACE AND METHOD FOR MAKING AND USING SAME

BACKGROUND OF THE INVENTION

1. Field of the Invention

The present invention relates to surfaces used to reflect light, and particularly to highly light reflectant surfaces that provide even diffusion of light energy from their surfaces.

2. Description of Related Art

Special light reflectant surfaces are used in a variety of applications requiring light energy to be close to completely reflected while providing an even distribution of light from the surface. While good mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "lambertian" reflectance.

For instance, projection screens, such as those used for slide or motion picture presentations, must provide both high reflectivity and a light diffusion/distribution over a sufficiently wide field so as to provide a clear image to most of an audience. Many reflectant screens employ a coating of glass beads or similar material as a reflectant aid to provide excellent reflectivity over a defined projection field (e.g., approximately 20° from a center line), with significantly diminished reflectivity outside of the defined projection field. These screens provide very good viewing within the defined field, and are less prone to interference from stray light sources other than the primary light source aimed perpendicular to the screen. In order to provide better viewing to a wider defined field, matte-finished screens are effective at providing a more even light distribution to an entire audience. Although hardly critical for most projection screen applications in darkened rooms, in either instance it is important that the screen absorb or transmit as little light as possible so as to assure maximum reflective image to the audience.

Reflectivity is far more critical in many other applications. For instance, displays used in electronic equipment (e.g., instrument panels, portable computer screens, liquid crystal displays (LCDs), etc.), whether relying on supplemental lights (e.g., backlight) or merely ambient light, require very good diffuse reflectant back surfaces to maximize image quality. Reflectivity is particularly critical with backlighted displays in battery powered equipment, where better reflectivity is directly related to smaller required light sources and resulting lower power demands.

Even more demanding applications for highly reflective materials are in casings used in laser construction. Since the efficiency of a laser is directly dependent upon its ability to effectively process light energy within its casing, it is critical that the casings be constructed from material that has extremely high reflectivity and excellent diffusion properties.

Perhaps the most demanding applications for reflectant materials are its use in a variety of optical test equipment, such as in reflectometers, integrating spheres, spectrophotometers, solar collectors and photovoltaic cells, etc. Highly reflective material is also used as standards in such equipment as well as serving to assure proper light handling within such equipment.

Due to the many different applications that exist for reflectant materials, it is not surprising that there are many different commercially available products with a variety of diffuse reflective properties. Until the present invention, the best material known with excellent diffuse reflectivity was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with reflectance over previously available reflectant material increasing from 97% to better than 99%. In laser casing construction, this is reported to produce an increase laser output by as much as 100% over previously available reflectant materials.

The SPECTRALON material is reported to be the most effective diffuse reflective material available today for visible light and near infrared (IR) reflectivity. As a result, in addition to laser casing construction, this material is used in a number of applications where extremely high reflectivity is required. For example, this material is considered so reflective that it serves as a standard material against which all other reflectant materials are measured in light reflectometers and other light measurement devices.

Despite the reported advantages of SPECTRALON material, it is considered quite deficient in many respects. First, this material comprises a relatively hard block of material that must be carefully carved or machined to desired shapes and dimensions. This severely limits how and where this material can be used and greatly increases the cost of using this material in many applications, especially where non-planar shapes are desired. Therefore, where a pliable material is desired in various light reflective applications, it is clear that the SPECTRALON material is not capable of supplying such a property. Furthermore, the additional machining process provides yet another source for contamination that can be detrimental to its reflective properties.

Second, the SPECTRALON material is apparently limited, both structurally and in its ability to reflect light, to a relatively thick minimum depth (i.e., a thickness of greater than 4 mm). Again, this serves to limit where and how this material can be used. Moreover, this limitation tends needlessly to increase both the amount of material required for a given application as well as the weight of the material required for such application.

Third, the SPECTRALON material is apparently relatively expensive to manufacture and purchase. These costs are only increased by the material's difficulty in processing into the final shape from the hard form (i.e., excessive amounts of material may have to be machined away and discarded during production) and its minimum thickness requirements. As a result, the SPECTRALON material is too expensive to be used in many applications that might otherwise benefit from its reflective properties.

Fourth, although SPECTRALON has high diffuse reflective properties, it is contemplated that even better performance may be possible in this regard. For instance, the SPECTRALON material has very good reflective properties for visible light up to a near IR range (i.e., from 300 to 1800 nm), the reflectivity of this material diminishes dramatically above 1800 nm. Moreover, it is believed that even better reflective performance might be possible even in the visible light range where SPECTRALON material delivers its best performance.

SUMMARY OF THE INVENTION

The present invention is an improved material and method for providing very high diffuse reflectivity of light from a surface. The present invention employs a reflectant material of expanded polytetrafluoroethylene (PTFE) comprising polymeric nodes interconnected by fibrils defining a microporous structure. It has been determined that this structure provides extremely high diffuse reflectivity, with significantly better than 99% reflectance of light provided. In fact, the material of the present invention has demonstrated higher diffuse reflectivity than the best diffuse reflective materials presently available.

Equally important, the material employed in the present invention demonstrates many other properties that make it particularly desirable for use as a reflectant material. First, the material is highly flexible, allowing it to be twisted and formed into a variety of shapes. This property vastly reduces the effort necessary to form many complicated reflective structures, and particularly non-planar structures. Moreover, many previously unattainable structures, such as extremely reflectant bendable structures, are now attainable through use of the present invention. Second, the material used in the present invention demonstrates excellent reflectant properties even at relatively thin (e.g., <1 mm) thicknesses, making the material lighter and less expensive to employ than presently available materials as well as lending its use to many applications not previously available.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved material and method for providing excellent diffuse light reflectance characteristics in a variety of reflectant products. As the term "light" is used herein, it is intended to include any form of electromagnetic radiation, but especially that in the spectrum of visible light (400 to 700 nm wavelength) and through infrared (IR) light radiation (700 to greater than 2500 nm wavelength). It should be appreciated that the material of the present invention may be tailored to modify reflectance in particular bands of light energy through the use of coatings, fillers, or similar materials.

Figure 1:
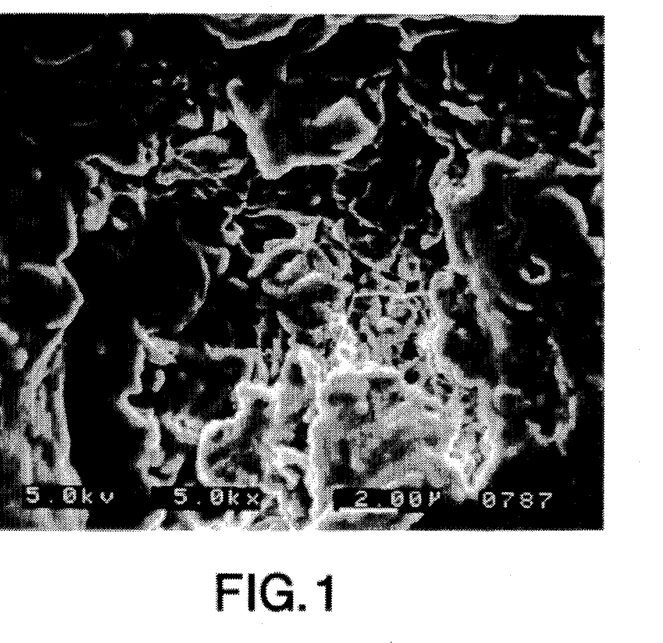
FIG. 1 is a scanning electron micrograph (SEM), enlarged 5000 times, showing the surface of a light reflectant material of a commercially available diffuse reflective material.

As has been explained, the best diffuse reflectant material commercially available today is that sold under the trademark SPECTRALON by Labsphere, Inc., of North Sutton, N.H. This material comprises a granular polytetrafluoroethylene material that is lightly packed and then molded into a rigid block. FIG. 1 is a scanning electron micrograph (SEM) of a surface of a ½ inch thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity, especially where non-planar reflectant surfaces are required; limited range of effective light reflectance across visible and IR light spectrum; relatively thick minimum thicknesses (i.e., its effective reflectance diminishes at thicknesses of less than about 4 mm); and less than optimum diffuse reflectivity. Despite these deficiencies, this material is considered the present standard by which the diffuse reflectivity of all other materials is measured.

Figure 2:
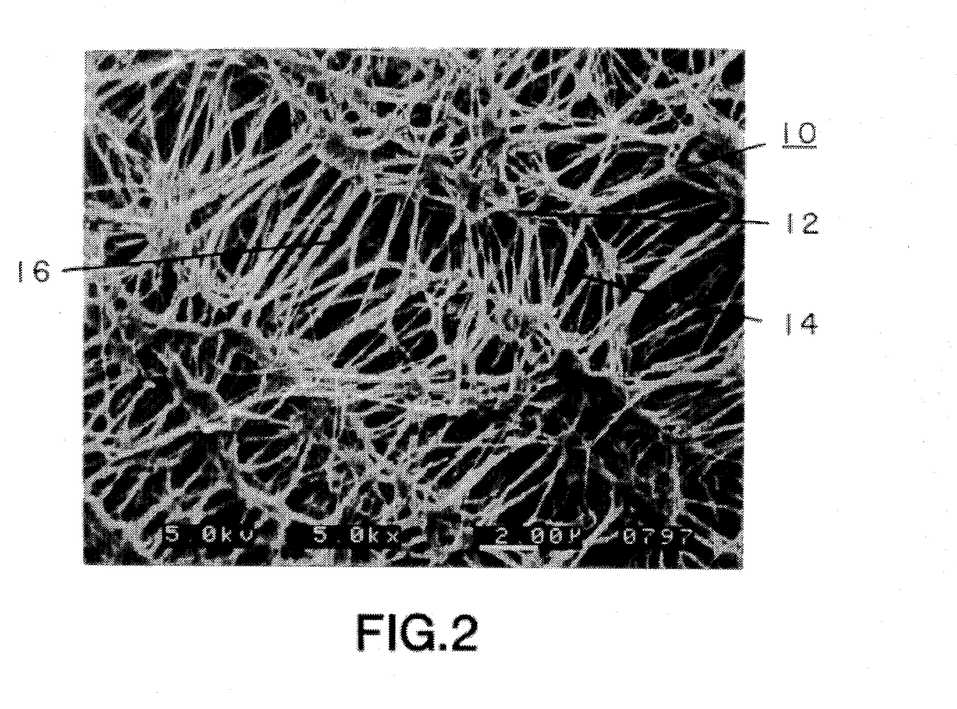
FIG. 2 is an SEM, enlarged 5000 times, showing the surface of one embodiment of a light reflectant material of the present invention.

The present invention employs a distinctly different material comprising an expanded polytetrafluoroethylene (PTFE), such as that made in accordance with U.S. Pat. Nos. 3,953,566, 3,962,153, 4,096,227, 4,187,390, and 4,902,423, all incorporated by reference. This expanded PTFE material comprises a microporous structure of microscopic polymeric fibrils (i.e., thread-like elements) interconnecting polymeric nodes (i.e., particles from which fibrils emerge). The structure of a biaxially expanded example of this material is shown in the SEM of FIG. 2. This material 10 comprises polymeric nodes 12 and numerous fibrils 14 extending from the nodes 12. As can be seen, numerous microporous voids 16 are provided within the material 10. As the term "expanded PTFE" is used herein, it is intended to include any PTFE material having a node and fibril structure, including in the range from a slightly expanded structure having fibrils extending from relatively large nodes of polymeric material, to an extremely expanded structure having fibrils merely intersect with one another at nodal points.

Expanded PTFE has a number of important properties that make it particularly suitable as a reflectant surface of the present invention. First, PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible. Moreover, while packed granular based PTFE material provides good diffuse reflectant properties, it has been discovered that the node and fibril structure of expanded PTFE provides a much higher diffuse reflectance property.

A preferred reflectant material of the present invention is made in the following manner. A fine powder PTFE resin is blended with a lubricant, such as odorless mineral spirits, until a compound is formed. The volume of lubricant used should be sufficient to lubricate primary particles of the PTFE resin so to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished, such as through the method taught in U.S. Pat. No. 3,953,566, by passing the dry coherent extrudate over a series of rotating heated rollers or heated plates at a temperature of between about 100° and 325° C. Alternatively, the extruded sheet may be expanded in the manner described in U.S. Pat. No. 4,902,423 to Bacino, prior to removal of the lubricant.

In either case, the material may be further expanded at a ratio of 1:1.1 to 50:1 (with 5:1 to 35:1 being preferred) to form a final microporous sheet. Preferably the sheet is biaxially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 2 mm. Sheets can be subsequently layered upon themselves and subjected to temperatures ranging from about 300° C. to 400° C. while applying sufficient pressures to bond the layers together.

Figure 3:
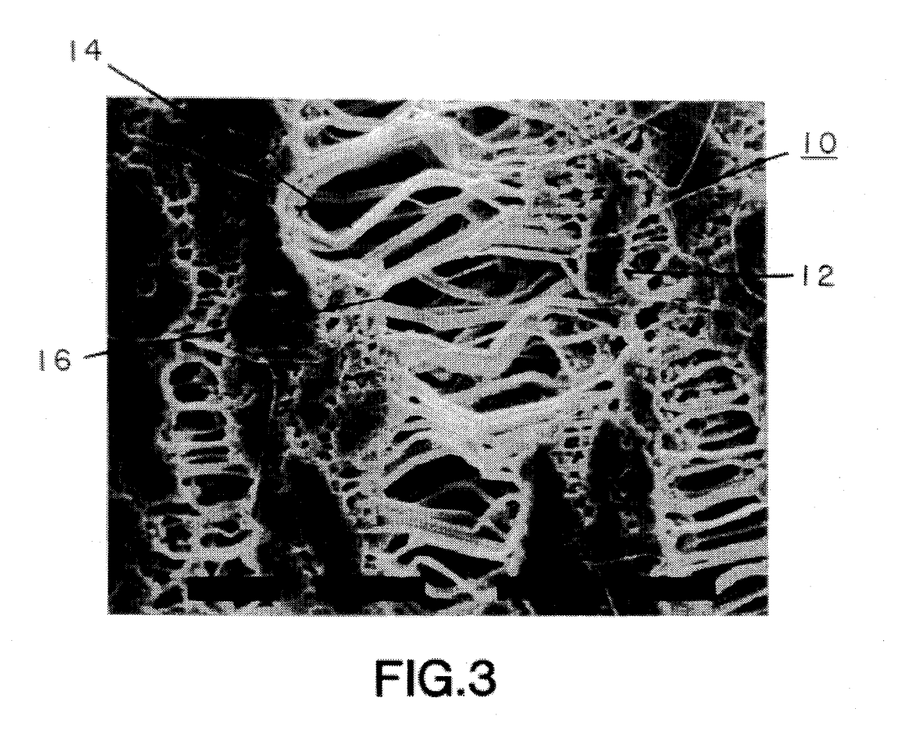
FIG. 3 is an SEM, enlarged 5000 times, showing the surface of another embodiment of a light reflectant material of the present invention.

It has been determined that by providing a microporous surface of polymeric nodes and fibrils, such as that of expanded PTFE, and particularly one that has been expanded in more than one direction, light is reflected off the node and fibril structure at a very high efficiency rate, with very even diffuse dispersion (i.e., diffusion) of the light. The SEM of FIG. 2 shows expanded PTFE material 10 that has undergone extensive expansion in two different directions. This structure exhibits a relatively "fine" structure with fibrils 14 oriented in both x and y directions, and small nodes 12 where the fibrils intersect. Still another embodiment of the present invention is shown in the SEM of FIG. 3. In this case, the expanded PTFE has been expanded in only the longitudinal direction. In this example there is a "coarser" structure characterized by larger nodes 12 and thicker fibrils 14. The fibrils 14 are oriented predominantly in a longitudinal direction.

As is explained in greater detail below, the present invention demonstrates extremely high diffuse reflectivity. When compared to the present reflectant standard of SPECTRALON material, the reflectant material of the present invention exhibited substantially higher diffuse reflectivity. Moreover, the reflectivity of the material of the present invention proved to have a number of other dramatically improved properties over the present standard. First, the reflectivity of the material remains high across a much wider spectrum of light wavelengths. Second, the material of the present invention demonstrates exceptional reflectivity even at much thinner profiles as compared with the existing standard material. Third, the material exhibits a very predictable, flat-line reflective response across a wide spectrum of light.

Figure 4:
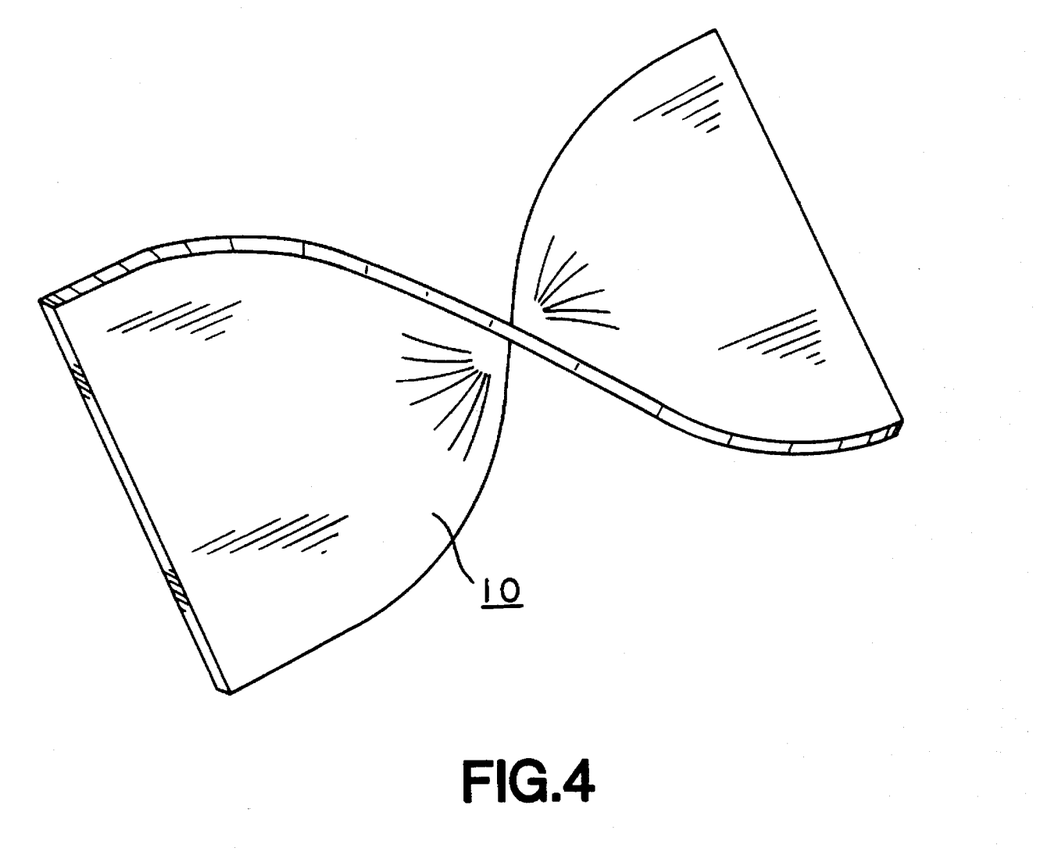
FIG. 4 is a three-quarter isometric view of a reflectant material of the present invention, wherein the flexibility of the material is demonstrated.

Another important improvement of the present invention is shown in FIG. 4. The reflectant material 10 of the present invention is highly malleable, moldable, and flexible, allowing it to be bent, twisted, curved, or otherwise formed into any suitable shape. In this respect, the reflectant material of the present invention is a dramatic improvement over previously available highly reflective materials, such as SPECTRALON polytetrafluoroethylene reflectant materials that must be carved or machined into desired shapes. With the material of the present invention, a host of different non-planar shapes can be formed with minimal effort. These types of thin, flexible, formable materials having at least 95% and even 90% reflectivity should have great value for a host of applications such as projection screens, backlighted displays, fluorescent light reflectors, photographic umbrellas, etc.

The present invention may comprise single or multiple layers of expanded PTFE, or may comprise a laminate of one or more layers of expanded PTFE and a backing support material. Since the expanded PTFE membrane alone tends to be susceptible to stretching and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR®, KEVLAR®, nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon, pressure of 1150 g per linear meter is applied to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

The present invention is particularly suitable for use with a variety of applications. These include reflectometers, integrating spheres, spectrophotometers, etc. One application of particular interest may be use of the present invention in solar collectors or photovoltaic cells. Since solar-driven devices such as these generally use sunlight in the range of 300 to 2200 nm, the reflectance of the present invention is particularly suitable.

Without intending to limit the scope of the present invention, the following examples illustrate how the present invention may be made and used:

EXAMPLE 1

A reflectant material of the present invention was prepared in the following manner:

A fine powder PTFE resin was combined in a blender with odorless mineral spirits (ISOPAR K available from Exxon Corp.) until a compound was obtained. The volume of mineral spirits used per gram of fine powder PTFE resin was 0.275 cc/gm. The compound was compressed into a billet and extruded through a 1.14 mm gap die attached to a ram type extruder to form a coherent extrudate. A reduction ratio of 47:1 was used.

Subsequently, the odorless mineral spirit was volatized and removed, and the dry coherent extrudate was expanded unaxially in the longitudinal direction 4.0 times its original length by passing the dry coherent extrudate over a series of rotating heated rollers at a temperature of 300° C. The sheet was subsequently subjected to an amorphous locking step by passing the sheet over a series of rotating heated rollers at a temperature of 385° C. such that the material was in contact with the rollers for about 12 seconds.

This material forms a relatively course expanded structure such as that shown in FIG. 3.

EXAMPLE 2

Another sheet of the present invention was produced in the same manner as Example 1 except for the following differences:

The volume of mineral spirits used per gram of fine powder PTFE resin was 0.297 cc/gm. The compound was compressed into a billet and extruded through a 1.52 mm gap die attached to a ram type extruder to form a coherent extrudate. A reduction ratio of 70:1 was used.

Subsequently, the odorless mineral spirit was volatized and removed. Three layers of the dry coherent extrudate were then stacked and expanded unaxially in the longitudinal direction 4.6 times its original length by passing the dry coherent extrudate over a series of rotating heated rollers at a temperature of 310° C. The sheet was subsequently subjected to an amorphous locking step by passing the sheet over a series of rotating heated rollers at a temperature of 385° C. for about 40 seconds.

Again, this material forms a relatively course expanded structure such as that shown in FIG. 3.

EXAMPLE 3

A sheet of the present invention was produced in the following manner:

A fine powder PTFE resin was combined with an odorless mineral spirit. The volume of mineral spirits used per gram of fine powder PTFE resin was 0.275 cc/gm. This mixture is aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate is then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature. This material forms a relatively fine expanded structure such as that shown in FIG. 2.

Multiple layers of this sheet material can then be stacked, placed under pressure, and exposed to a temperature of about 360° C. for about 30 minutes to bond the layers into a cohesive sheet of virtually any desired thickness.

EXAMPLE 4

Layered expanded PTFE material similar to that described in Example 3 above is commercially available from W. L. Gore & Associates, Inc., Elkton, Md., as a sheet gasket material under the trademark GORE-TEX GR® sheet gasketing. This material is available in different thicknesses (i.e., constituting different number of layers formed into cohesive sheets). In order to test the effectiveness of the material of the present invention as compared to commercially available light reflectant materials, various samples of sheet gasketing material were tested as follows:

Sample 1: A composite sheet comprising about 15 layers of expanded PTFE sheets with the following properties:

| Thickness: | 0.5 mm |
| Density: | 0.60 g/cc |

Sample 2: A composite sheet comprising about 25 layers of expanded PTFE sheets with the following properties:

| Thickness: | 1.0 mm |
| Density: | 0.57 g/cc |

Sample 3: A composite sheet comprising about 60 layers of expanded PTFE sheets with the following properties:

| Thickness: | 2.2 mm |
| Density: | 0.61 g/cc |

Sample 4: A composite sheet comprising about 85 layers of expanded PTFE sheets with the following properties:

| Thickness: | 3.4 mm |
| Density: | 0.59 g/cc |

Sample 5: A composite sheet comprising about 150 layers of expanded PTFE sheets with the following properties:

| Thickness: | 6.2 mm |
| Density: | 0.51 g/cc |

Additionally, material similar to that described in Examples 1 and 2, above, is commercially available from W. L. Gore & Associates, Inc., as a gasket tape under the trademark GORE-TEX® gasket tape. Again, this material is available in different thicknesses. Samples of this material were tested as follows:

Sample 6: A gasket tape comprising a single layer of relatively course expanded PTFE with the following properties:

| Thickness: | 1.0 mm |
| Density: | 0.50 g/cc |

Sample 7: A gasket tape comprising a single layer of relatively course expanded PTFE with the following properties:

| Thickness: | 3.3 mm |
| Density: | 0.66 g/cc |

Each of Samples 1 through 7 were tested in the following manner to quantify their reflective properties:

A 2 inch by 2 inch swatch from each of Samples 1 through 7 was placed in a CARY 5E Spectrophotometer with a Labsphere integrating sphere. The spectral range measured was 175 nm to 2500 nm. Data below 250 nm was not reported due to the unreliability of the standard material below this value. All measurements were made in the double-beam mode with the same working standard in the sphere's reference reflectance port. The reflectance standard used was of SPECTRALON material, Labsphere Serial Number SRS-99-010-8111-A. Photomultiplier detection was used below 800 nm and lead sulfide detection was used above 800 nm. All measurements were normalized with respect to the baseline of the system. This data is then corrected by multiplying it by the correction factors supplied with the reflectance standard. This data was then averaged and plotted.

Figure 5:
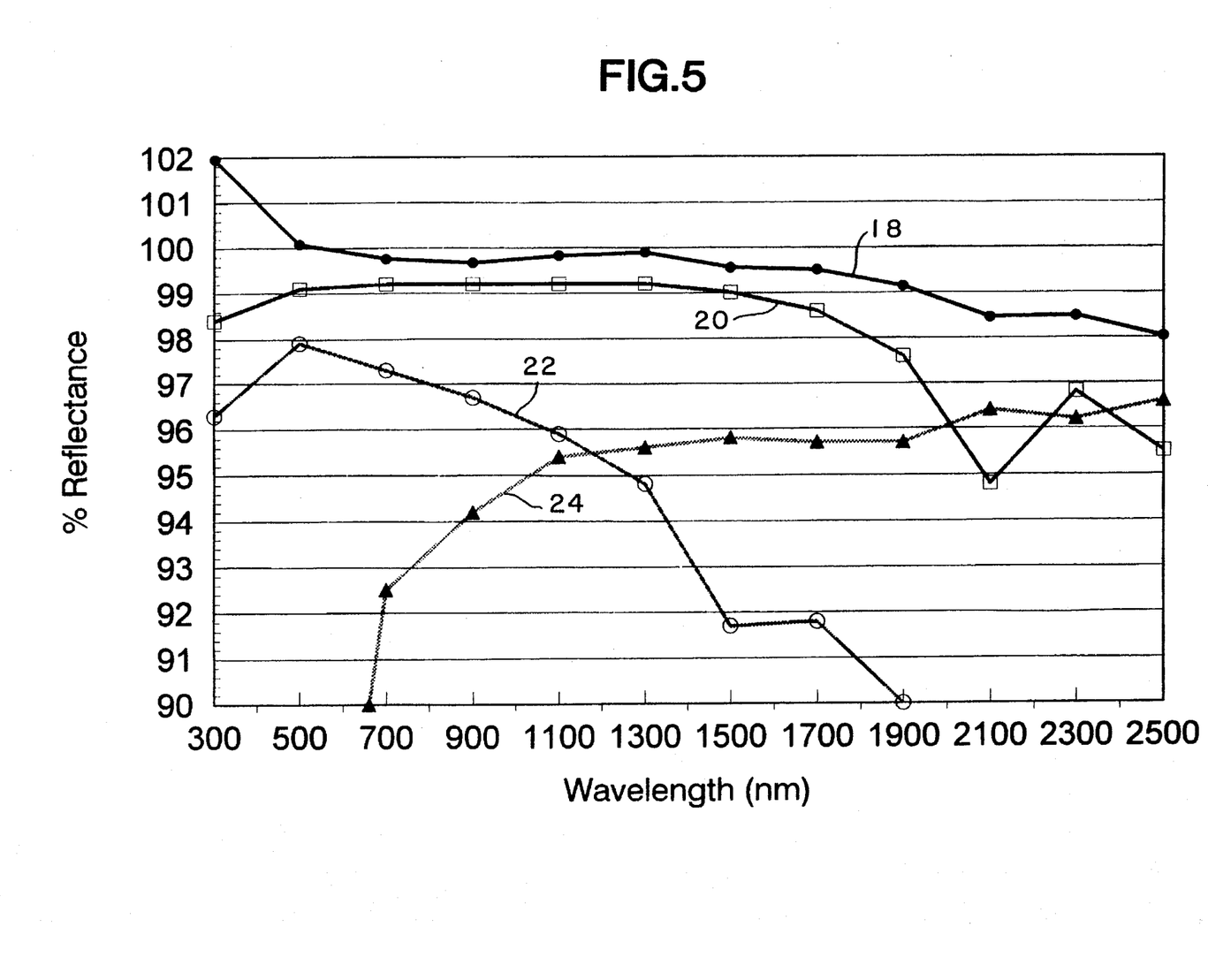
FIG. 5 is a graph plotting the reflectance verses wavelength of a reflectant material of the present invention as compared to commercially available materials.

The graph of FIG. 5 records the reflectance verses light wavelength of one sample of the present invention as compared with three commercially available reflectant materials. Line 18 is the performance of the material of Sample 5 of the present invention as compared with commercially available reflectant materials SPECTRALON (Line 20), SPECTRAFLECT (Line 22), and INFRAGO LD (Line 24), each available from Labsphere, Inc., North Sutton, N.H. These materials are represented by their manufacturer to be some of the highest diffuse reflectant materials available. The data plotted for the commercially available materials was obtained from the technical information catalog published by Labsphere, Inc. As can be seen, at all wavelengths of light tested, the reflectant material of the present invention demonstrated markedly higher reflectivity than the commercially available reflectant materials. Additionally, the material of the present invention retained its reflective properties into much higher wavelengths than the commercial materials.

It should be noted here that the reflectivity numbers reported herein are not asserted to show better than complete reflectance of light, but, rather, as demonstrating significantly better reflectance than the present state-of-the-art SPECTRALON reflectant material used as a standard.

Figure 6:
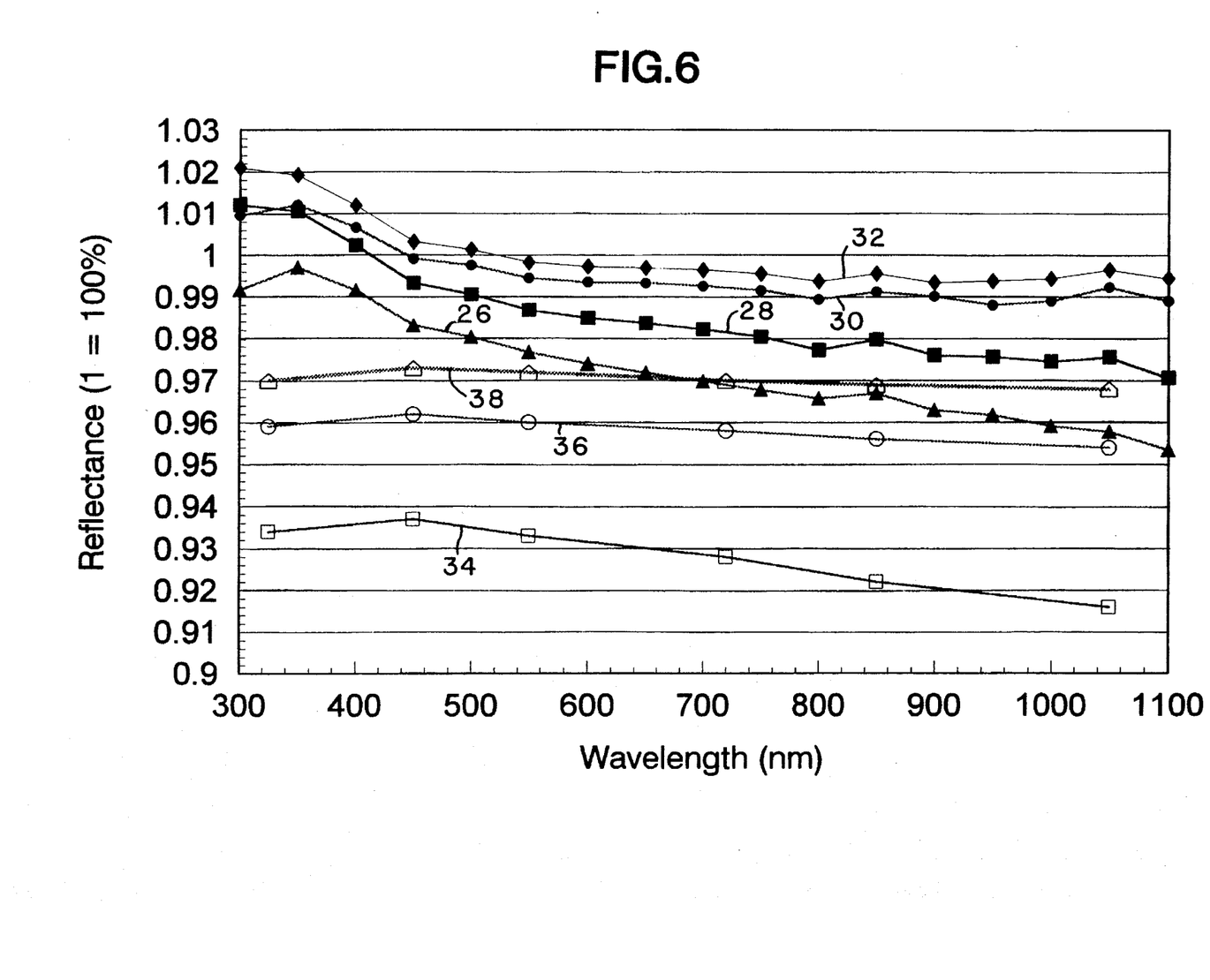
FIG. 6 is a graph plotting the reflectance verses wavelength of varying thicknesses of the reflectant material of the present invention as compared to commercially available materials.

The graph of FIG. 6 records the reflectance verses light wavelength of different thicknesses of inventive material compared to similar thicknesses of SPECTRALON reflective material. Lines 26, 28, 30, and 32 respectively represent the performance of Samples 1, 2, 3, and 4 of the present invention. By way of comparison, lines 34, 36, and 38 respectively represent the performance of 1.0 mm, 2.0 mm, and 3.0 mm thick samples of SPECTRALON material according to published data from the technical catalog of Labsphere, Inc. Sample 1 was included here even though information is not available for SPECTRALON material at a thickness of 0.5 mm. In all cases the inventive material was substantially higher in reflectivity than SPECTRALON reflectant material of similar thickness. This difference appears to be even more pronounced as the materials decrease in thickness. It should be noted that the 0.5 mm material of the present invention, even though six times thinner than the 3.0 mm SPECTRALON material, demonstrates equal to or higher reflectivity within the visible wavelengths of 400 to 700 nanometers.

Figure 7:
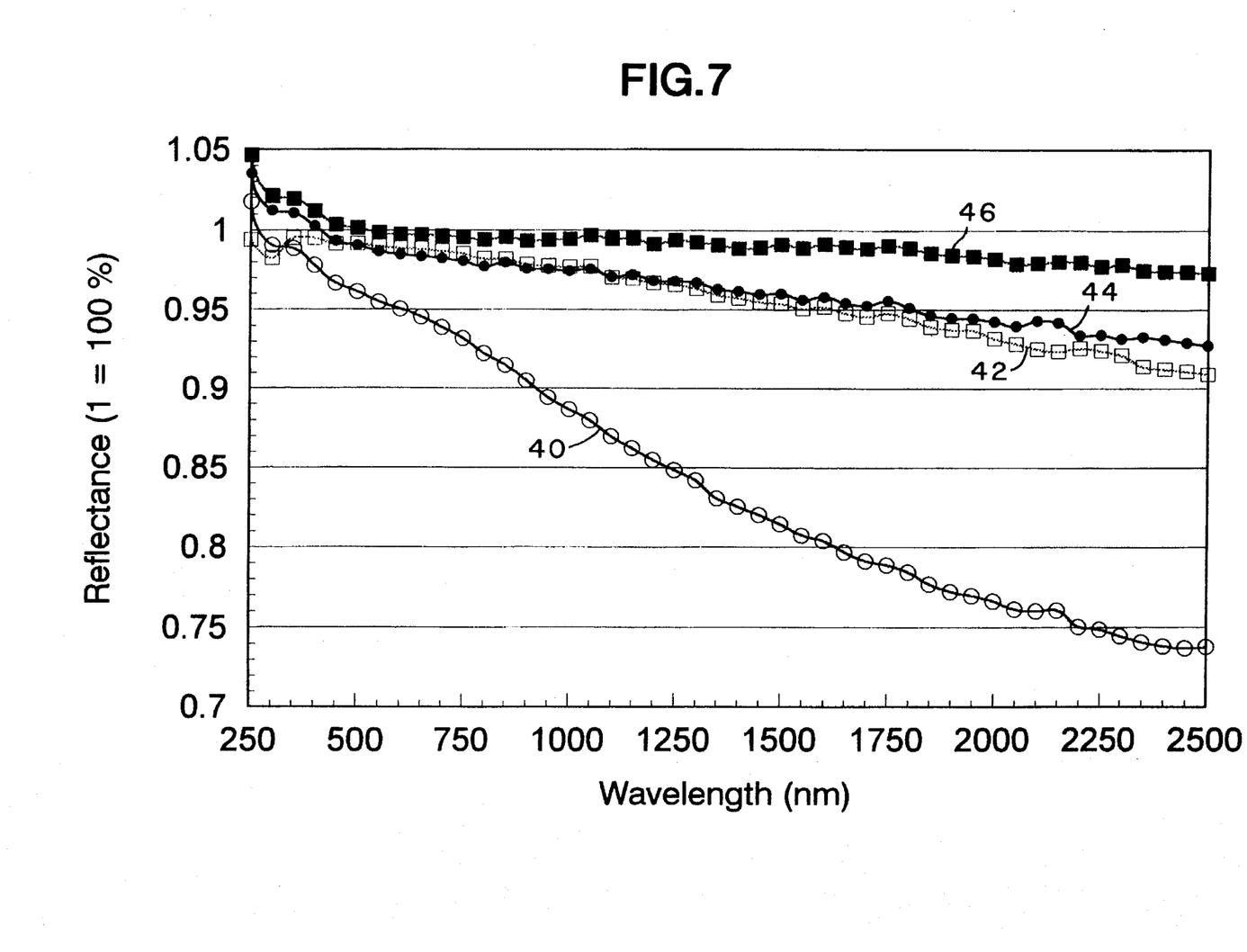
FIG. 7 is a graph plotting the reflectance verses wavelength of various structures of embodiments of the reflectant materials of the present invention.

The graph of FIG. 7 records the reflectance verses light wavelength of four samples with similar densities of expanded PTFE material of the present invention. Of the four samples, there are two different thickness levels represented, with a coarse and fine structure material at each level. Lines 40 and 42 represent Samples 6 and 7, respectively, each with a relatively coarse structure characterized by large nodes and thick fibrils. Lines 44 and 46 represent Samples 2 and 4, respectively, each having a relatively fine structure characterized by small nodes and fine fibrils.

In like thickness comparisons, the finer structure material demonstrated much higher reflectivity than the coarser structure material at all wavelengths tested. For instance, Sample 2 with a thickness of 1.0 mm was substantially more reflective than Sample 6 with the same thickness of 1.0 mm.

As can be seen in FIGS. 6 and 7, the light reflectant material of the present invention provides better diffuse reflective properties than prior reflective materials over a wide range of light wavelengths. In FIG. 6, Sample 1, line 26, shows a range of percentage diffuse reflectivity from above about 99% through about 98%, 97%, 96%, and down to about 95.2%. Sample 2, line 28, shows a range of percentage diffuse reflectivity from above about 101% through about 100%, 99%, 98%, and down to about 97%. Sample 3, line 30, shows a range of percentage diffuse reflectivity from above about 101% through about 100%, 99%, down to about 98.8%. Sample 4, line 32, shows a range of percentage diffuse reflectivity from above about 102% through about 101%, 100%, and down to about 99.5%.

Similarly, in FIG. 7, Sample 6, line 40, shows a range of percentage diffuse reflectivity from about 99% through about 95%, 90%, 85%, 80%, 75%, down to about 74%. Sample 7, line 42, shows a range of percentage diffuse reflectivity of above about 99% through about 98%, 97%, 96%, 95%, 94%, 93%, 92%, down to about 91%. Sample 8, line 44, shows a range of percentage diffuse reflectivity from about 103.5% through about 103%, 102%, 101%, 100%, 99%, 98%, 97%, 96%, 95%, 94%, down to about 93%. Sample 9, line 46, shows a range of percentage diffuse reflectivity from about 105% through about 103%, 102%, 101%, 100%, 99%, 98%, down to about 97.5%.

As can be seen in both FIGS. 6 and 7, at a wavelength in the range of 400 to 700 nm (i.e., around 500 nm), the light reflective material of the present invention demonstrate diffuse light reflectivity of about 98% (Sample 1, line 26), about 99% (Sample 2, line 28), about 99.8% (Sample 3, line 30), about 100.2% (Sample 4, line 32), about 96% (Sample 6, line 40), about 99% (Samples 7 and 8, lines 42 and 44), and about 100% (Sample 9, line 46).

The above Examples demonstrate that the reflectant material of the present invention performs far better and more consistently as a diffuse reflectant material over a wider spectrum of light than the best diffuse reflectant material presently commercially available.

Due to the diffuse reflectant and structural properties of the present invention, it can be used in a plethora of possible applications. As a general reflectant material, the present invention can be employed to form reflectant screens (e.g., projection TV or movie screens), reflectors for back lit displays, highway information placards, etc. Furthermore, specialized reflectors for fluorescent or incandescent lighting can be designed for hospital or clean room environments where soft diffuse lighting is desired yet cleanliness and contamination must be minimized. Expanded PTFE, because of its inertness and inherent non-particulation characteristics, is ideally suited for these applications.

The high flexibility of the present invention particularly lends itself to such applications since it can be rolled or otherwise compacted, as is often required, and it can be easily formed into different shapes, and particularly non-planar shapes. The present invention's ability to provide effective reflectance at very thin dimensions also lends itself to use in this regard, particularly by allowing greater design flexibility and by decreasing the cost and weight of the material.

Another area of particular interest is in the application of the present invention to apparatus requiring a high diffuse reflectance, such as in cavities used for laser generation. In these applications the increased reflectance of the present invention can vastly increase the efficiencies of apparatus employing it. Also, the structural properties of the present invention with regard to flexibility, thinness, and even inertness may dramatically improve the range of application of reflectant materials in these applications.

The fact that the material of the present invention is more reflectant than the best material presently known makes it a logical choice as the next generation of standard materials for testing reflectance and other light properties of other materials.

Finally, the present invention may prove extremely useful in a variety of other applications, including use in solar collector, photocells, and other applications where high diffuse reflectivity is desirable.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of providing improved diffuse reflectivity of light comprising providing a reflectant material comprising an expanded polytetrafluoroethylene having polymeric nodes interconnected by fibrils defining microporous voids therein;

mounting the reflectant material to cause light energy to reflect off it;

whereby the reflectant material provides diffuse reflectivity with greater than 99% of visible light with a wavelength between at least 400 to 700 nm striking the reflectant material reflecting from the material.

2. The method of claim 1 that further comprises providing as the reflectant material a flexible sheet of expanded polytetrafluoroethylene, allowing the reflectant material to be readily formed into different shapes; and forming the reflective material to provide a non-planar reflective surface.

3. The method of claim 2 that further comprises providing as the reflectant material a material having a thickness between 0.5 mm and 3 mm.

4. The method of claim 1 that further comprises providing as the reflectant material a material having a thickness between 0.5 mm and 3 mm.

5. The method of claim 1 that further comprises employing the reflectant material as a light reflectant panel.

6. The method of claim 1 that further comprises employing the reflectant material as a light reflectant material within a laser.

7. The method of claim 1 that further comprises employing the reflectant material as a reflectant standard.

8. A method of providing improved diffuse reflectivity of light comprising providing a reflectant material comprising an expanded polytetrafluoroethylene having polymeric nodes interconnected by fibrils defining microporous voids therein;

mounting the reflectant material to cause light energy to reflect off it;

whereby the reflectant material provides diffuse reflectivity with greater than 90% of visible light with a wavelength between at least 400 to 700 nm striking the reflectant material reflecting from the material.

9. The method of claim 8 that further comprises forming the flexible reflectant material to provide a non-planar reflective surface.

10. The method of claim 8 that further comprises providing as the reflectant material a material having a thickness between 0.5 mm and 3 mm.

11. The method of claim 8 that further comprises employing the reflectant material as a light reflectant panel.

12. The method of claim 8 that further comprises employing the reflectant material as light reflectant material within a laser.

13. The method of claim 8 that further comprises employing the reflectant material as a reflectant standard.

14. A method of providing improved diffuse reflectivity of light comprising providing a reflectant material comprising an expanded polytetrafluoroethylene having polymeric nodes interconnected by fibrils defining microporous voids therein, the reflectant material being of a thickness of less than 1 mm;

mounting the reflectant material to cause light energy to reflect off it;

whereby the reflectant material provides diffuse reflectivity of greater than 95% of visible light with a wavelength between at least 400 to 700 nm striking the reflectant material reflecting from the material.

15. The method of claim 14 that further comprises providing as the reflectant material a flexible sheet of expanded polytetrafluoroethylene, allowing the reflectant material to be readily formed into different shapes; and forming the reflective material to provide a non-planar reflective surface.

16. The method of claim 8 that further comprises providing a reflectant material with a diffuse reflectivity of greater than 96%.

17. The method of claim 8 that further comprises providing a reflectant material with a diffuse reflectivity of greater than 97%.

18. The method of claim 8 that further comprises providing a reflectant material with a diffuse reflectivity of greater than 98%.

19. The method of claim 8 that further comprises providing a reflectant material with a diffuse reflectivity of greater than 99%.

20. The method of claim 8 that further comprises providing a reflectant material with a diffuse reflectivity of greater than 96% in a range of light wavelength of 400 to 700 nm.

21. The method of claim 8 that further comprises providing a reflectant material with a diffuse reflectivity of greater than 97% in a range of light wavelength of 400 to 700 nm.

22. The method of claim 8 that further comprises providing a reflectant material with a diffuse reflectivity of greater than 98% in a range of light wavelength of 400 to 700 nm.

23. The method of claim 8 that further comprises
providing a reflectant material with a diffuse reflectivity of greater than 99% in a range of light wavelength of 400 to 700 nm.

24. The method of claim 1 that further comprises providing an expanded polytetrafluoroethylene that is biaxially expanded.

25. The method of claim 8 that further comprises providing an expanded polytetrafluoroethylene that is biaxially expanded.

26. The method of claim 14 that further comprises providing an expanded polytetrafluoroethylene that is biaxially expanded.

27. The method of claim 1 that further comprises providing the reflectant material with a thickness of between 0.5 and 6.2 mm.

28. The method of claim 8 that further comprises providing the reflectant material with a thickness of between 0.5 and 6.2 mm.

29. The method of claim 8 that further comprises providing a reflectant material that is flexible so as to allow the material to be readily formed into various shapes.

30. The method of claim 8 that further comprises providing a reflectant material that provides a diffuse reflectivity of greater than 95% of the visible light striking the reflectant material.

31. The method of claim 30 that further comprises providing a reflectant material that is flexible so as to allow the material to be readily formed into various shapes.

* * * * *